United States Patent Office 3,446,860
Patented May 27, 1969

3,446,860
METHOD OF MAKING PHENYLLITHIUM
Oscar Francis Beumel, Jr., West Chester, Pa., assignor to Foote Mineral Company, Exton, Pa., a corporation of Pennsylvania
No Drawing. Filed June 29, 1967, Ser. No. 649,871
Int. Cl. C07f 1/02
U.S. Cl. 260—665          6 Claims

ABSTRACT OF THE DISCLOSURE

A solution of a monohalobenzene in ethyl ether is gradually added to a dispersion of lithium metal in benzene containing ethyl ether, using certain defined relationships between said monohalobenzene, ethyl ether, lithium and benzene, to provide phenyllithium in high yield and purity.

---

The preparation of phenyllithium by reacting lithium with a monohalobenzene according to the equation:

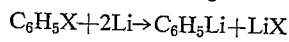

where X is a halogen, usually chlorine or bromine, is well known. It is also well known that this reaction can be carried out in ethyl ether resulting in a phenyllithium: ethyl ether complex in a 1:1 mol ratio, and that this complex is soluble in benzene (N. G. Chernova and B. M. Mikhailov, J. of Gen. Chem., U.S.S.R., vol 25, page 2249, 1955; N. P. Neureiter and F. G. Bordwell, J. Am. Chem. Soc., vol. 81, page 578, 1959, and see also U.S. Patent 3,197,516). This solubility of the complex in benzene with the accompanying insolubility of the by-product lithium halide in benzene has been relied upon as a means of separating the lithium halide from the desired product.

Referring specifically to Patent 3,197,516, in one example the reaction between the lithium metal and the monohalobenzene is carried out in ethyl ether by adding a solution of chlorobenzene in ethyl ether to a dispersion of lithium in ethyl ether. Eventually excess ether is distilled off and is replaced by benzene. The yield of phenyllithium is 82%, based on the chlorobenzene. In another embodiment of said patent, chlorobenzene is added to a dispersion of lithium metal in a mixture of benzene and ethyl ether. The yield of phenyllithium in this embodiment is 87.5% based on the chlorobenzene.

In the stated reaction, undesirable side reactions are possible. These include coupling of the monohalobenzene with phenyllithium to form biphenyl, and the formation of benzyne which reacts with phenyllithium to form 2-lithiobiphenyl. Such side reactions and by-products are highly undesirable, and, to the extent that they form, they reduce the yield of the desired phenyllithium and introduce impurities.

It is the principal object of the present invention to provide a novel method for making phenyllithium.

It is another object of the present invention to provide a novel method for making a stable solution of phenyllithium:ethyl etherate complex.

It is a further object of the present invention to provide a novel method for making phenyllithium in high yield and purity.

These and other objects will become apparent from a consideration of the following specification and the claims.

The process of the present invention comprises gradually adding a solution consisting essentially of a monohalobenzene, selected from the group consisting of chlorobenzene and bromobenzene, in ethyl ether, the proportion of ethyl ether in said solution being from at least about 0.50 up to 0.75 mol thereof per mol of monohalobenzene, to a dispersion of lithium metal, containing from about 0.2 to about 2% of sodium based on the weight of the lithium, in benzene containing from about 0.50 mol to about 0.25 mol of ethyl ether per mol of said monohalobenzene, the total ethyl ether employed being from 0.95 to 1.1 mols thereof per mol of said monohalobenzene, the amount of lithium in said dispersion being from about 2 to about 2.2 mols thereof per mol of said monohalobenzene, and the relative proportions of said benzene and said total ethyl ether being from about 60 to about 95%, by weight, of the former based on the combined weight of said benzene and said ethyl ether.

Following the foregoing procedure has been found to result in phenyllithium yields generally of 90% or greater, even up to about 94%, based on the monohalobenzene. And these high yields are obtained using, at most, only a very slight excess—up to about 10% excess—of lithium. It is believed that, by following the described procedure, side reactions are minimized. As stated these side reactions include the coupling of the monohalobenzene with phenyllithium to form biphenyl, and the formation of benzyne with the subsequent reaction thereof with phenyllithium to form 2-lithiobiphenyl. Analysis of products prepared according to the present invention have revealed no detectable 2-lithiobiphenyl and only 0.5–1% of biphenyl.

It will be noted that mol ratio of total ethyl ether employed to monohalobenzene is substantially 1:1. It has been found that amounts significantly below or above this amount will result in decreased yields of phenyllithium. Thus, for a reaction that provides a 94% yield using 1.0 mol of total ethyl ether per mol of chlorobenzene, if, other conditions remaining the same, only 0.9 mol of ethyl ether are employed, the yield drops to 87%; on the other hand, if 1.1 mols of ethyl ether are employed, the yield drops only to 93%. Thus, ethyl ether is the limiting reagent, the yield decreasing to the extent that the mol ratio of ethyl ether to monohalobenzene falls below 1.0. Only as much phenyllithium forms as there is ethyl ether to form a 1:1 complex therewith. In the preferred practice of the present invention the mol ratio of total ethyl ether to benzene is 1.0:1.0.

In accordance with the present procedure, it is also important that at least half, and preferably most, of the ethyl ether be added with the monohalobenzene as the phenyllithium is formed, rather than being present initially, thereby to decrease the amount of side reactions and therefore undesirable by-products. If all of the ethyl ether is present in the benzene initially, and the monohalobenzene added as such thereto, the yield of phenyllithium drops, say to 90%, where it would otherwise have been 94% according to the present procedure. The optimum amount of ethyl ether present in the benzene initially to which the monohalobenzene-ethyl ether solution is added is about 0.25 mol per mol of monohalobenzene. If the amount drops below about 0.25 mol, the yield of phenyllithium decreases sharply. If, on the other hand, the amount of ethyl ether present in the benzene initially exceeds 0.25 mol, the yield decreases gradually. The maximum amount of ethyl ether present initially in the benzene should not exceed about 0.50 mol thereof per mol of monohalobenzene. Thus, in accordance with the preferred embodiment of the present invention, a solution consisting essentially of the monohalobenzene and ethyl ether, the proportion of ethyl ether being about 0.70 to about 0.75 mol thereof per mol of monohalobenzene, is added to the dispersion of lithium metal in benzene containing from about 0.25 to about 0.30 mol of ethyl ether per mol of monohalobenzene, the mol ratio of total ethyl ether to monohalobenzene being 1.0:1.0.

As stated, the solution of monohalobenzene in ethyl ether is added gradually to the lithium dispersion in the benzene-ethyl ether mixture. This means that the addition of the solution of monohalobenzene in ethyl ether will take place over a period of at least about ½ hour, and the duration of this addition may range up to about 2 hours. In accordance with preferred practice, this addition takes place in from about 1 to about 1¾ hours. After completion of the addition of the monohalobenzene solution, it is preferred to permit the reaction mixture to stand an additional period of from about ½ to about 2 hours to insure reaction of all the monohalobenzene.

The temperature of the reaction mixture is preferably maintained at from about 15 to about 20° C. While further cooling may be employed to lower the temperature to 10° or even 0° C., no advantage is obtained thereby, and, on the other hand, permitting the temperature to rise to say above 35° C., also provides no advantage and may even result in a slight decrease in yield.

The lithium employed will be, finely-divided; that is, as stated, in well known dispersion form. Such dispersions are prepared by rapidly stirring molten lithium metal into an inert liquid, such as mineral oil or toluene, so that the metal solidifies as very tiny droplets, generally no more than about 100 microns in size and most usually from about 25 to about 75 microns in size. The finely-divided lithium metal may be filtered from the liquid to provide, after washing and drying, what is known as dry dispersion or, after simply removing the bulk of the liquid as by filtering or decanting, the metal may be washed with and reslurried in another liquid, such as benzene which will serve as part of the reaction medium in the present process.

As also stated, a small amount of sodium will be included with the lithium, as by adding sodium to molten lithium in preparing the above-described dispersion. The amount of sodium so added will generally range from about 0.3 to about 2%, and preferably from about 0.5 to about 1%, by weight, based on the weight of the lithium.

Reference has been made above to the use of a monohalobenzene as one of the reagents. Usually this is a monochloro- or monobromobenzene, preferably the former.

Following the stated reaction, the lithium halide which is formed is preferably removed from the solution of phenyllithium:ethyl etherate, as by centrifuging or filtration. The resulting solution ranges in color from a clear burnt orange to a light golden yellow solution.

Solutions of phenyllithium in ethyl ether are not stable for prolonged periods of time at room temperature. The well-known relatively slow attack of phenyllithium on ethyl ether makes the preparation of phenyllithium in ethyl ether commercially undesirable. The use of a minimal amount of ethyl ether to obtain solutions of 1:1 phenyllithium:ethyl etherate complex in benzene lowers the ethyl ether concentration considerably and thereby must give more stability to the solutions. The ethyl ether complexed as the 1:1 phenyllithium:ethyl etherate in benzene is not as reactive toward cleavage as is excess ethyl ether which is not so complexed. The exact structure of the 1:1 phenyllithium:ethyl etherate complex actually may be a dimer or tetramer, but the ratio of phenyllithium to ethyl ether is still 1:1.

The following examples are given for the purpose of illustration and are not intended to limit the scope of the invention in any way.

Example 1

A solution of 63 ml. (0.618 mol) of chlorobenzene in 49 ml. (0.464 mol) of ethyl ether is added slowly to a dispersion lithium metal containing 1% sodium (9.25 g., 1.32 mols) in 150 ml. of benzene and 16 ml. (0.154 mol) of ethyl ether under argon atmosphere with vigorous stirring. The reaction is initiated with the first 5 ml. of chlorobenzene solution, and cooling is applied during the remaining addition, which takes 1½ hours, to maintain the temperature at 15° C. After the addition of the chlorobenzene solution is completed, the reaction mixture is maintained at 15–20° C. for an additional ½ hour with stirring, and then allowed to warm over another ½ hour to room temperature with stirring. The mixture is filtered, to remove precipitated lithium chloride, using a 15 ml. benzene rinse. A total of 226 g. of clear golden yellow solution is recovered with a phenyllithium concentration of 21.4% (by acid titration using phenolphthalein indicator) and a 94.0% yield of phenyllithium based on the chlorobenzene.

When the foregoing procedure is followed using, however, only 42 ml. of ethyl ether with the chlorobenzene to provide a mol ratio of total ethyl ether to chlorobenzene of 9.1, the yield of phenyllithium drops to 86.5%.

Example 2

The procedure of Example 1 is followed except that 65 ml. (0.618 mol) of bromobenzene is used in place of the chlorobenzene and the temperature of the reaction mixture is maintained at about 10° C. There is obtained 253 g. of a transparent burnt orange colored solution containing 18.88% of phenyllithium, by acid titration using phenolphthalein indicator, for a 92.1% yield of phenyllithium based on the bromobenzene.

Example 3

A solution of 63 ml. (0.618 mol) of chlorobenzene in 32.5 ml. (0.309 mol) of ethyl ether is added over a period of 1 hour to a dispersion of lithium metal containing 1% sodium (10.5 g.) in 150 ml. of benzene and 32.5 ml. (0.309 mol) of ethyl ether under argon atmosphere with stirring. The temperature is maintained at 20° C. Thereafter the reaction mixture is stirred for an additional hour at room temperature. The mixture is then filtered, to remove lithium chloide, using a 15 ml. benzene rinse. A total of 2259. of clear solution is recovered with a phenylilthium concentration of 21.25% and a 92.3% yield of phenyllithium based on the chlorobenzene.

I claim:

1. The process for making phenyllithium which comprises adding a solution consisting essentially of a monohalobenzene, selected from the group consisting of chlorobenzene and bromobenzene, in ethyl ether, the proportion of ethyl ether being from at least about 0.50 to about 0.75 mol thereof per mol of monohalobenzene, to a dispersion of lithium metal, containing from about 0.3 to about 2% of sodium based on the weight of the lithium, in benzene containing from about 0.50 to about 0.25 mol of ethyl ether per mol of said monohalobenzene, the total ethyl ether employed being from 0.95 to 1.1 mols thereof per mol of said monohalobenzene, the amount of lithium in said dispersion being from about 2 to about 2.2 mols thereof per mol of said monohalobenzene, and the relative proportions of said benzene and said total ethyl ether being from about 60 to about 95%, by weight, of the former based on the combined weight of said benzene and said ethyl ether.

2. The process of claim 1 wherein the proportion of ethyl ether to monohalobenzene in said solution added to said dispersion is from about 0.70 to about 0.75 mol thereof per mol of monohalobenzene.

3. The process of claim 1 wherein said monohalobenzene is monochlorobenzene.

4. The process of claim 1 wherein the total ethyl ether employed is 1.0 mol thereof per mol of monohalobenzene.

5. The process of claim 1 wherein the temperature of the reaction mixture is maintained at from about 15 to about 20° C.

6. The process of claim 2 wherein the monohalobenzene is monochlorobenzene; and wherein the total ethyl ether employed is 1.0 mol thereof per mol of monochlorobenzene.

References Cited

UNITED STATES PATENTS 3,197,516   7/1965   Esmey et al. _____ 260—665

OTHER REFERENCES

Kirk-Othmer Encyclopedia of Chemical Technology: Interscience Publishers, New York, N.Y., vol. 12, p. 553 (1967).

TOBIAS E. LEVOW, *Primary Examiner.*

A. P. DEMERS, *Assistant Examiner.*

PO-1050
(5/69)

UNITED STATES PATENT OFFICE
CERTIFICATE OF CORRECTION

Patent No. 3,446,860      Dated May 27, 1969

Inventor(s) Oscar Francis Beumel, Jr.

It is certified that error appears in the above-identified patent and that said Letters Patent are hereby corrected as shown below:

Col. 1, line 56;    "phenyllthium" should be -- phenyllithium --
Col. 2, line 9;    "0.2" should be -- 0.3 --
Col. 2, line 34;    "the" omitted before "mol"
Col. 4, line 29;    "9.1" should be -- .9:1 --
Col. 4, line 49;    "chloide" should be -- chloride --
Col. 4, line 50;    "phenylilthium" should be -- phenyllithium --

SIGNED AND
SEALED

MAR 17 1970

(SEAL)
Attest:

Edward M. Fletcher, Jr.
Attesting Officer

WILLIAM E. SCHUYLER, JR.
Commissioner of Patents